Oct. 12, 1954  H. W. ROEBER  2,691,246
GLASS HEADER MANUFACTURING MACHINE
Filed Oct. 13, 1948  5 Sheets-Sheet 2

INVENTOR.
Henry W. Roeber
BY
Attorney

Patented Oct. 12, 1954

2,691,246

UNITED STATES PATENT OFFICE 2,691,246

GLASS HEADER MANUFACTURING MACHINE

Henry W. Roeber, Emporium, Pa., assignor to Sylvania Electric Products Inc., a corporation of Massachusetts Application October 13, 1948, Serial No. 54,307

17 Claims. (Cl. 49—2)

The present invention relates generally to the manufacture of glass envelopes, such as lamp bulbs, vacuum tubes, and the like, and more particularly to an ancillary machine which is particularly adapted to be associated with, and operated with, a glass header manufacturing machine of the type disclosed in an application filed by Stanley J. Gartner, December 12, 1945, Serial No. 634,420, now Patent No. 2,618,904, granted November 25, 1952 and assigned to the assignee of the present application.

Briefly, the machine of the above-mentioned application is adapted to receive a plurality of lengths of wire or terminal pins in pre-formed glass cups, and, in a plurality of operations, mold the terminal pins into the glass cup to form a header for a vacuum tube. The machine includes a work table, or carrier, in the form of a turret mounted to rotate about a vertical axis, and on which is a plurality of vertically extending spindles regularly spaced in a circle concentric with the turret and adjacent its outer peripheral edge. The turret is arranged to be intermittently rotated or indexed through an arc equal to the angular spacing of the spindles, while the spindles, which are independently rotatable about their own axis, have a driving connection common to all of them which is engaged and disengaged at the various stations around the turret in accordance with the operations to be performed at each station. The upper end of each spindle has a cap piece, or lower mold, having a central aperture for receiving a rod mounted for reciprocating movement in the spindle, and surrounding the central aperture is a plurality of regularly spaced smaller holes for receiving lengths of wire or terminal pins to be imbedded in the glass cup and form an integral part thereof. These molds independently, and successively, meet with an upper mold on the press member. After the terminal pins are automatically dropped into the small apertures of the lower mold so as to extend upwardly therefrom, these spindles traverse a loading zone where glass wafers or cups having a central opening and smaller openings registering with those in the mold, are placed on the molds with the pins extending therethrough. Thereafter, during the traverse of the spindles, the wafers or cups are subjected to flames from high heat burners for the purpose of fusing the metal terminals to the glass and for softening the glass so that when the spindles successively reach the passing stations, the glass is in condition for molding.

Now it has been found desirable to preheat the glass cups before they are placed on the molds of the machine of the prior application. Heretofore this has been accomplished by providing an elongated gas fired oven with a moving belt passing through the oven. An operator at one end of the oven places the cups on the belt, and at the other end a second operator removes the heated cups with tongs and places them on the spindles of the molding machine as they traverse the loading zone. Since the cups must be aligned with the pins in the mold, and since they are too hot to handle manually, considerable dexterity is required of the operator in order to properly place the cups on the molds. Furthermore, the preheating oven is a large device and occupies a great deal of valuable space in the vicinity of the molding press. Finally, the previously known arrangement requires at least two skilled operators to operate the press and pre-heater arrangement.

The present invention provides a small compact preheater having a small rotating turret which rotates in synchronism with the main turret of the molding press and includes automatic means for depositing cold glass cups on the spindles of the pre-heating turret. After the cups have been pre-heated an automatically operating mechanism removes the cups from the pre-heater and places them on the molds in the molding machine. Additional mechanism is provided for registering the holes in the glass cups with the pins on the molding machine. The operation of the heated cup transferring mechanism is so tied in with the supervisory system of the main press that in the event of an insufficient number of pins being placed in the mold at a station previous to the cup welding station, the transferring mechanism is disabled. A substantial reservoir chute for the cold cups supplied to the pre-heater is provided so that continuous attention by a skilled operator is not required.

The present invention will be more fully understood by reference to the following detailed description which is accompanied by a drawing in which

Fig. 8 is a vertical section of the cup transferring mechanism of Fig. 7 taken along lines 8—8 of Fig. 7;

Fig. 9 is a plan view of one of the glass cups which the present invention is adapted to operate, while Fig. 10 is a view of one of the spindles of the present pre-heater with a glass cup thereon, and Fig. 11 is an elevational view of one of the molding spindles of the main machine showing the header pins therein and a glass cup similar to that shown in Fig. 9 on the pins in proper position for further operations to be performed thereon;

Fig. 13 is a view in section, taken along line 13—13 of Fig. 12, showing further details of the cup centering mechanism, while

Figures 1, 2, 16:
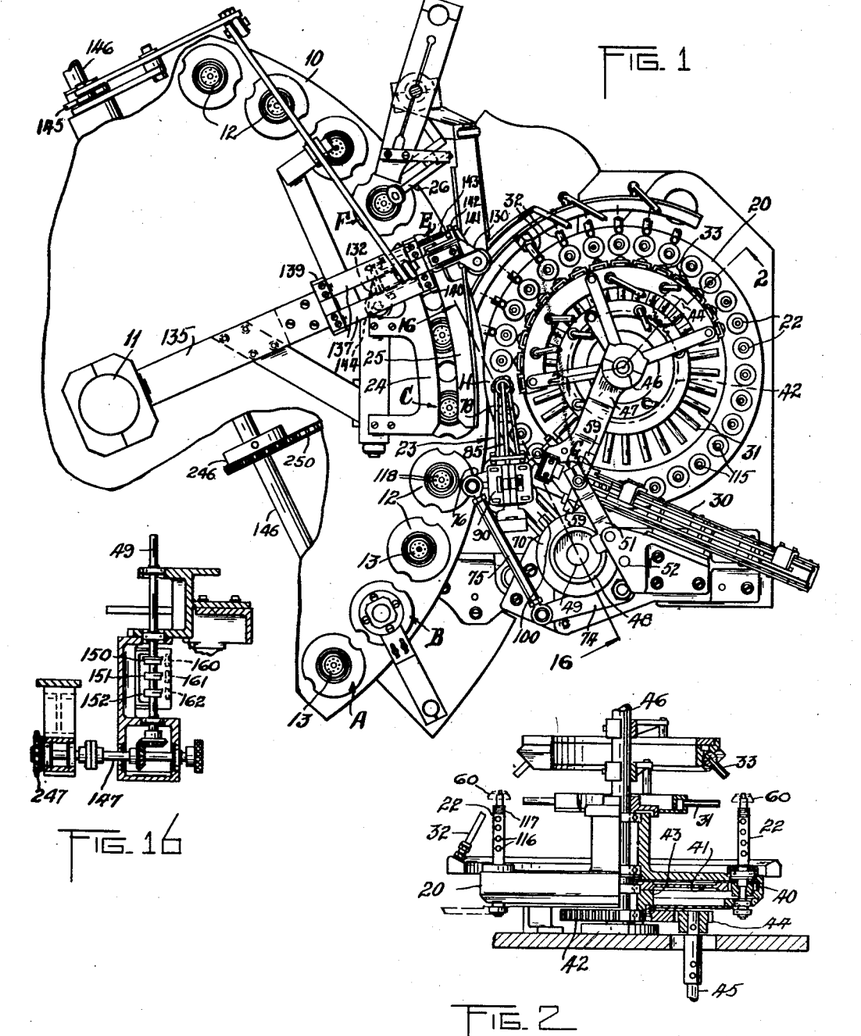
Fig. 1 illustrates in plan view an embodiment of the present invention as associated with a glass molding machine of the type disclosed in the above entitled application. The cup molding machine is fragmentarily shown with only so much detail as is necessary for an understanding of the present invention.
Fig. 2 is a view in elevation, and partly in section, of the cup pre-heater of the present invention, the section line being taken along line 2—2 of Fig. 1.
Fig. 16 is a fragmentary vertical section taken along line 16—16 of Fig. 1, showing the location of operating cams for the switches of Fig. 17, which is a schematic circuit diagram illustrating supervisory features of the present arrangement whereby improper operation is prevented.

In Fig. 1, I have shown a glass-header manufacturing machine of the type mentioned above in a fragmentary view with only so much of the details of that machine shown as are necessary for an understanding of the present invention. The glass envelope manufacturing machine here shown includes a work table or carrier 10 in the form of a turret mounted to rotate about a vertical axis at 11 on which are placed a plurality of vertically extending spindles 12 regularly spaced in a circle concentric with the turret table 10 and adjacent its outer peripheral edge. These spindles 12 are independently rotatable about their own axes but have a driving connection (not shown) common to all of them. Rotation of the turret 10 is effected by regular intermittent angular movement through an arc equal to the angular spacing between the spindles 12. During each cycle the turret 10 traverses a plurality of stations, at predetermined ones of which different operations are performed, and where the spindles may be independently locked against rotation. Since the drive mechanism of the header making machine turret and the spindles is no part of the present invention it has not been shown here, but further details may be obtained from an inspection of the above-mentioned application.

The operation of the machine insofar as it is necessary for an understanding of the present invention is substantially as follows:

It should first be understood that on the upper end of each spindle 12 is a cap piece or lower mold 13 having a central aperture 14 which receives a rod mounted for reciprocating movement in the spindle and that surrounding the central aperture is a plurality of regularly spaced smaller holes 15 for receiving lengths of wire or terminal pins to be imbedded in the glass header, whereby they eventually form an integral part thereof. Further, it should be understood that these molds independently and successively mate with an upper mold (not shown), whereby the glass header is formed as desired. At a first station A terminal pins are automatically dropped into the small apertures 15 of the lower mold 13 and extend upwardly therefrom. As the turret is indexed to the next position or station at B, a pin checking mechanism, having a plurality of independently closable contacts, one for each contact pin, is swung over the mold 13 and senses the presence of the pins in their holes 15. If the required number of pins is not present, the circuit is closed and a supervisory circuit to be later described is set up which disables subsequent operations of the press and of the pre-heater forming the present invention. Assuming that all of the pins are correctly placed in a mold 13, when the spindle 12 reaches the loading station C, a glass wafer or cup having a central opening and smaller openings registering with holes 15 in the mold is placed on the mold and one rotated relative to the other if necessary, so that the pins extend through the smaller openings. In previous practice the glass wafers, or cups, previously pre-heated by being passed through an annealing oven, were manually placed in position on the molds by an operator using tongs or heavy gloves. According to the present invention, a smaller rotatable turret 20 is provided alongside the main turret 10 and arranged to rotate in synchronism therewith. The smaller turntable 20 has a plurality of cup-receiving spindles 22 regularly spaced about its periphery. As each of the spindles 12 containing pins properly placed in the holes arrives at loading station C, a transferring mechanism generally indicated by reference numeral 23 removes a heated cup from a spindle 22 and places it on spindle 12. Guide rails 24 and 25 are provided at station C and extend over an arc covering two subsequent stations. A glass cup placed on spindle 12 at station C will not rest down on the mold as far as is necessary for subsequent operations, but will instead ride along guide rails 24 and 25. When the loaded spindle reaches station E, brake and centering fingers extend inwardly toward the cup and center it accurately with respect to the mold 13 and apply a slight braking influence on the cup. As the spindle 12 is rotated at this position, the pins within the mold 13 are oriented with respect to the holes in the glass cup or wafer until the holes are aligned with the pins, thus allowing the glass cup or wafer to seat against the base of the mold. At a subsequent station F, a sensing mechanism 26 detects the presence or absence of a cup on the mold 13. In the event that there is no cup present at this station an automatic mechanism is influenced to remove the pins from the mold in that location. It will be seen that there are two circumstances which will cause the pin removing mechanism to be actuated. If all pins are present but no glass cup was added at station C, the pins will be removed. If an insufficient number of pins was sensed at station B, causing the cup transferring mechanism to be disabled at station C, there will be no cup present at station F, and the insufficient number of pins will be removed. Thus, the mold 13 will travel around the rest of its orbit idle and empty. In the event a glass cup is properly loaded on the proper number of pins, during the traverse of the spindles 12 around the remaining of their orbit, about the center of turret 10 the cups or wafers are subject to flames from high heat burners for the purpose of fusing the metal terminal pins to the glass and for softening the glass for the molding operations performed in the machine. Further, as the spindles successively reach a stem loader station, the glass is in condition for an exhaust stem of glass tubing to be joined thereto. After the metal terminals are fused in place, the header molded as required, and the glass stem sealed to the header, the assembly is subjected to the flames of low heat burners at several successive stages so that it may be gradually cooled. Finally, the completed header base is removed at a station just previous to station A.

Figure 3:
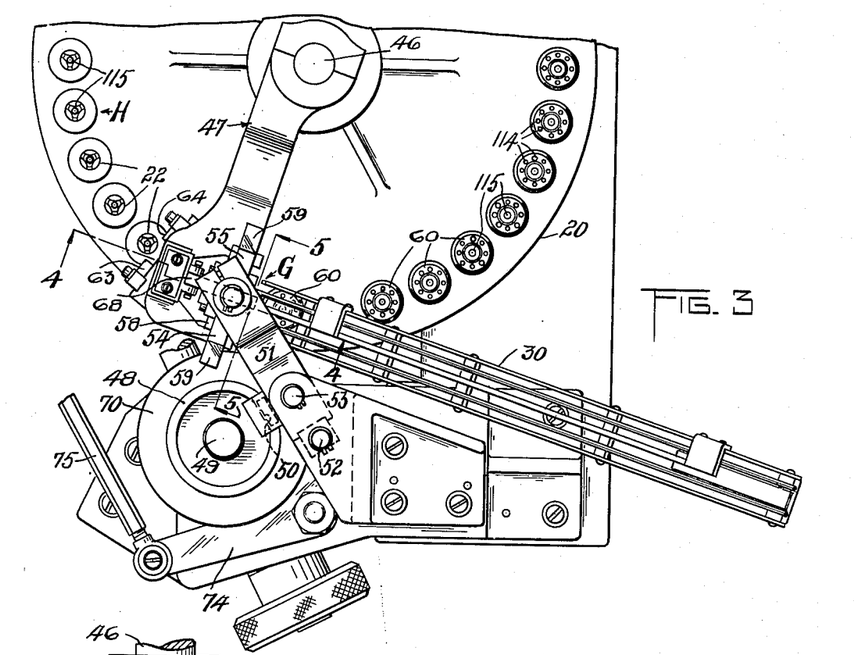
Fig. 3 is an enlarged plan view of a portion of the showing of Fig. 1, showing, in more detail, portions of the glass cup storage chute and transferring mechanism.

The turret 20 of the pre-heater rotates in a counterclockwise direction in a step by step operation. At station G, cold glass wafers or header cups are loaded on to spindles 22 one at a time from a storage chute 30. A number of low heat gas burners 31 are provided to gradually warm the glass cups loaded on spindles 22 as the turret 20 rotates. High heat burners 32 and 33 are provided over about the last half of the orbit of travel of the cups for more strongly heating the cups as they approach the unloading station at H. At station H, the transfer arm 23 picks the heated cups from the spindles 22 and transfers them to the spindles 12 on the main turret. Fig. 2 is a view in elevation and partly in section of the cup pre-heater structure showing in more detail the arrangement of the spindles 22 around the periphery of turret 20 and their rotating means including gears 40, one on the bottom end of each of the spindles 22, meshing with a large gear 41 carried together with large gear 42 on a rotatable sleeve 43. Gear 42 meshes with a pinion gear 44 on shaft 45 which is driven by a motor (not shown). It will thus be seen that each of the spindles 22 are independently continuously rotated at all times when the machine is in operation, independent of whether or not the turret 20 is being indexed from one position to the other. The indexing mechanism is not shown in detail since any desired form of construction which will rotate the turret 20 in steps synchronously with the rotation of the main turret 10 may be employed. The central shaft 46 extending through turret 20 not only serves as a bearing support means for the turret 20 and a support for the inner burners 31 and 33, but also as a supporting point for arm 47 which carries the reservoir chute 30 and the escapement mechanism which drops the glass cups into the spindles. The cup escapement is shown in more detail in Figs. 3, 4, and 5. In Fig. 3 is shown a circular cam 48 carried by and rotated by a vertical shaft 49 which rotates one revolution at each "dwell" of the turret 20. Riding on cam 48 is a cam roller 50 carrying a vertically reciprocable carriage 51. Carriage 51 is guided in its vertical reciprocation by guide rods 52 and 53 and is so placed that one end reciprocates exactly over the center of a spindle 22 when in a position of rest at the cup loading station for the pre-heater unit. This end of carriage 51 carries a pair of vertically depending fingers 54 and 55 having inwardly turned ends 56 and 57. Fingers 54 and 55 are pivoted on a carriage block 58 and are each provided with counter balances 59 to normally urge the inwardly turned ends 56 and 57 toward each other so as to support a cup on their upper surfaces.

Figures 4, 6:
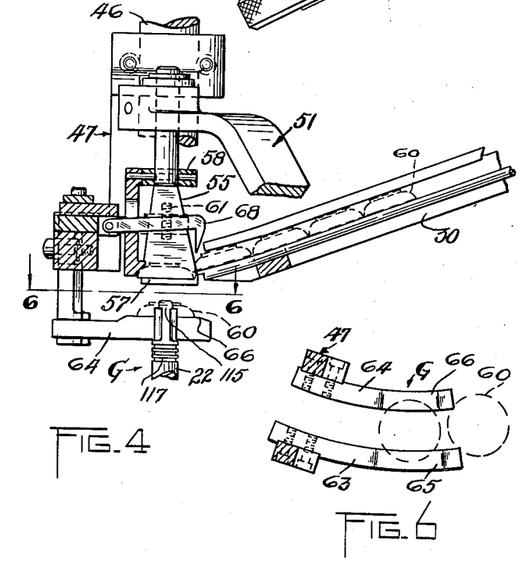
Fig. 4 is a vertical section taken along lines 4—4 of Fig. 3 showing the cup escapement mechanism in more detail.
Fig. 6 is a view, in plan, taken along line 6—6 of Fig. 4, showing in more detail the form of the cup guiding fingers.
Figure 5:
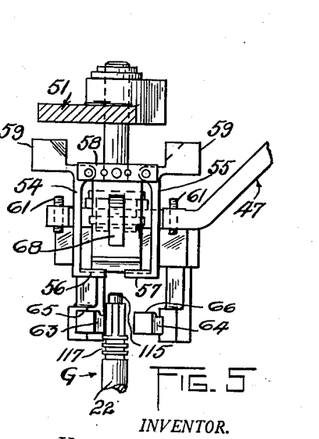
Fig. 5 is a vertical section taken along line 5—5 of Fig. 3 showing an end view of the cup escapement, which is also shown in Fig. 4.
Figure 7:
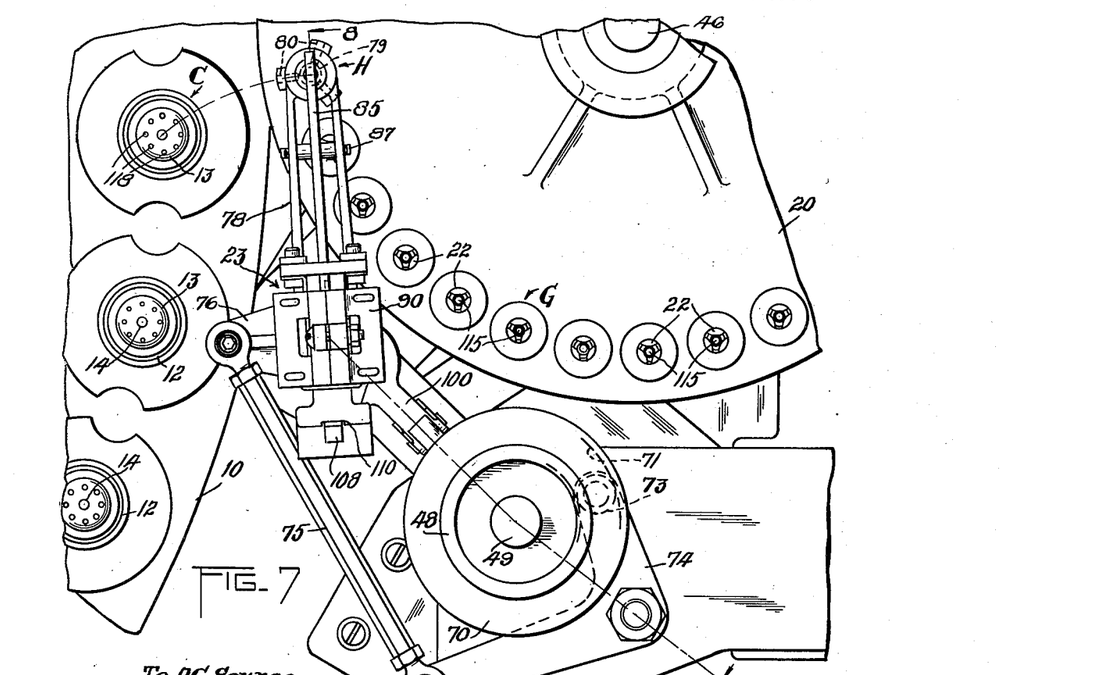
Fig. 7 is an enlarged plan view similar to Fig. 3, but showing in more detail the cup transferring mechanism for transferring the heated cups from the pre-heater turret to the molding turret.
Figures 8, 9, 10, 11:
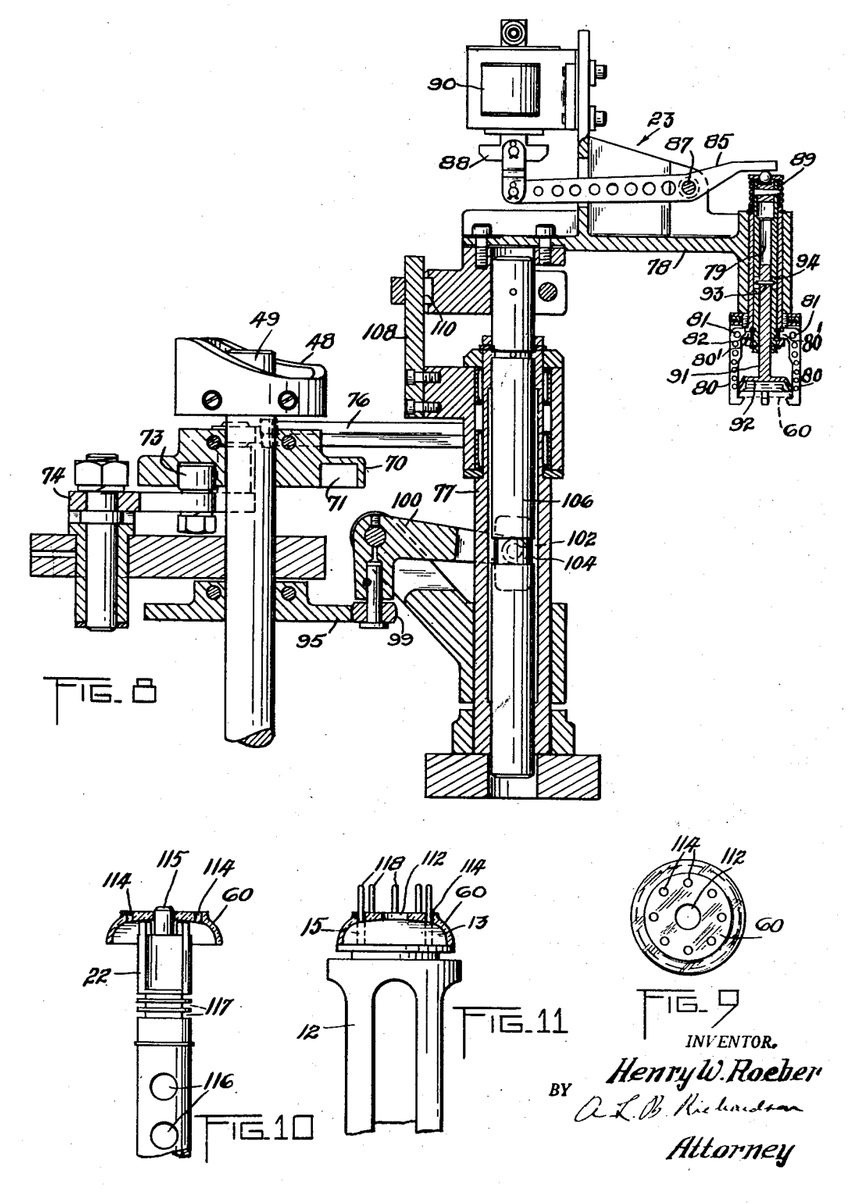
Figure 12:
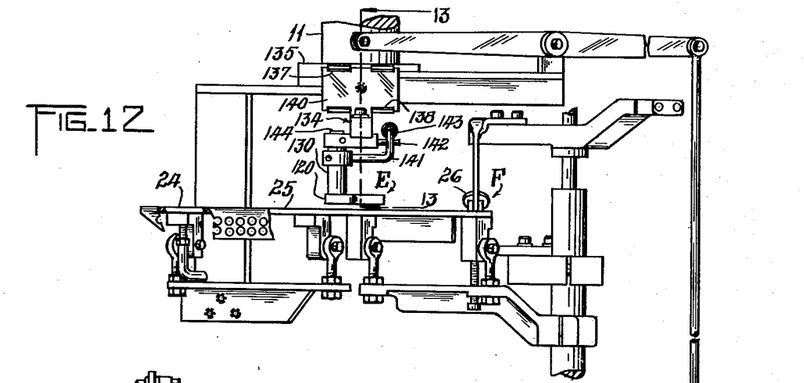
Fig. 12 is an elevational view of the mechanism for properly centering the heated glass cups on the molding heads.

Now in Fig. 4 the cup reservoir 30 is shown in section with a number of glass cups indicated in dotted lines as at 60. The width of cup escapement jaws 54 and 55 is just sufficient to receive one cup from the reservoir chute. As member 51 is lowered by the rotation of cam 48, fingers 54 and 55 are lowered carrying the cup on the inturned ends 56 and 57 downwardly toward the spindle 22, which is directly therebeneath. As the downward movement continues, the counterweights 59 strike against stop screws 61, causing the cup fingers 54 and 55 to be separated, thus releasing one cup which drops a short distance on to arcuate cup receiving tracks 63 and 64 (Fig. 6), between which the spindles 22 pass. The arcuate tracks 63 and 64 have slightly raised portions 65 and 66 where the cup is actually received. The raised portions permit the centering of the hole in the center of the cup with regard to the spindle without allowing the cup to drop with any considerable force against the end of the spindle which action would tend to break or split the cup. As the cup carrying fingers 54 and 55 are lowered, a second cup might tend to slide from the reservoir chute 30 into the space between the cup receiving fingers as they are lowered, were it not for the provision of an escapement finger 68 which is lowered as the fingers 54 and 55 are lowered and positively blocks the exit of the cup chute 30. In the event there is already a cup on a particular spindle 22 which is at any given instant of time under the cup escapement mechanism, there will be no space for the cup between the fingers to drop down as the fingers are separated by the cooperating action of screws 61 and counter-weights 59. As the fingers are again lifted the turned-in portions 56 and 57 will again enter under the lower edge of the cup, which will be again lifted up to the position shown in Fig. 4. The action of the mechanism which transfers a heated cup from a pre-heater turret 20 to a spindle 12 on the main turret 10 may be understood by reference to Figs. 7 and 8. The shaft 49, in addition to carrying cam 48, carries a second cam 70 having an eccentric groove 71 on its lower face. In groove 71 runs a cam follower stud 73, carried on bell crank 74. Bell crank 74, through the intermediary of a link 75, oscillates arm 76 about the axis of a hollow vertical standard 77. Thus, the cup transferring arm denoted generally by reference character 78 is oscillated from a position immediately over one of the spindles 22 to position immediately over one of the spindles 12. The free end of arm 78 carries a hollow sleeve 79 mounted for vertical reciprocation therein. About the lower end of sleeve 79, are mounted a number of cup receiving fingers 80 pivoted at 81 for radial movement. Sleeve 79 is vertically reciprocated by pressure of one end of actuating lever 85 thereagainst moving it downward while spring 89 lifts it when the pressure of lever 85 is relaxed. Lever 85 is pivoted at 87, and at its other end is connected to the armature 88 of a solenoid 90. As sleeve 79 is moved downwardly, a ring 82 at the lower end thereof presses against fingers 80' at the inner ends of cup fingers 80, thus causing the fingers 80 to be swung outwardly. Slideably mounted within sleeve 79 is a rod 91 carrying at its lower end a cupped weight 92. A limited amount of relative movement between sleeve 79 and rod 91 is permitted by the pin 93 playing within slot 94. Weight 92 assumes positive discharge of a cup from between fingers 80 when they are open. In picking up a cup from a spindle 22 as the sleeve 79 is moved downwardly the fingers 80 are spread apart to pass over the edges of the cup 60 and then as solenoid 90 is released the sleeve 79 moves upwardly causing the fingers 80 to grip the cup between their lower edges and the inner surface of weight 92. The necessary vertical movement of the cup transferring arm 78 is provided by a third cam 95 on shaft 49 having an operating face bearing against cam follower 99 carried on a bell crank 100. The outer end of bell crank 100 carries a pin 102 passing through an aperture in the vertical standard 77 and engaging in a groove 104 in an inner shaft 106. Shaft 106 rotates, and moves axially within standard 77. Arm 78 is firmly clamped on the upper end of the inner shaft 106. Its alignment with arm 76 is assured by the operation of a fixed vertical guide 108 passing through a hole 110 at the rear end of the transfer arm 78. Thus, by means of cams 70 and 95, the cup transferring mechanism is moved through a multiple path. First jaws 80 are opened by the action of solenoid 90, the jaws are lowered over a cup in the spindle 22, the jaws are closed and raised, the transfer arm is swung to a position such that the cup is directly over a spindle 12, and the jaws 80 are opened. The action of weight 92 discharges a cup into a mold 13. In Fig. 9, I have shown a plan view of one of the cups 60 showing in more detail the central aperture 112 and the surrounding pin holes 114. In Fig. 10 is shown one of the cups 60 on a pre-heater spindle 22, with a central pin 115 of the spindle 22 passing through the central aperture 112 of the cup 60. Fig. 10 shows also the holes 116 and grooves 117 cut in spindle 22 whereby the transference of heat from the heating burners 31, 32, and 33 of Figs. 1 and 2 to the turret itself is minimized. Fig. 11 shows one of the cups 60 seated in position on one of the molds 13 of the main molding machine with terminal pins 118 seated in the pin holes 15 and the cup 60 properly seated with the pins 118 passing through the pin holes 114.

Figure 13:
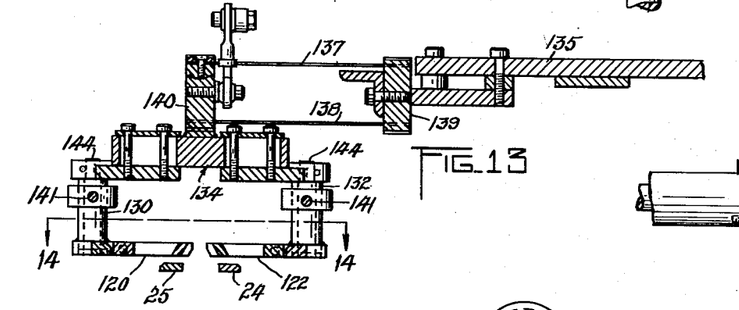

The final operation of transferring a heated cup from the pre-heater to the molding spindle 12 requires the positive alignment of the cup holes 114 with the pins 118, so that the relationship shown in Fig. 11 is attained. This is accomplished by the structure shown in Figs. 12, 13, 14, and 15, as well as in plan view in Fig. 1. It will be remembered that the cup transferring arm 78 releases a cup 60 on to tracks 24 and 25 immediately over one of the molding spindles 12. The cup does not rest down flat on the mold 13, but in any event pins 118 rest within the concavity in the cup. The cup is carried along tracks 24 and 25 by the pins 118. At station E, when the main turret 10 stops, the spindle 12 at that position is positively rotated. At the same time centering fingers 120 and 122 (Fig. 13) are moved downwardly toward the cup and their arcuate inner ends lightly engage the upper surface and edges of the cup. It is thus accurately centered with respect to the spindle, and held stationary while the spindle revolves. Thus, the pins 118 are compelled to find appropriate holes 114 and the cup 60 drops down flatly over the pins 118.

Figure 14:
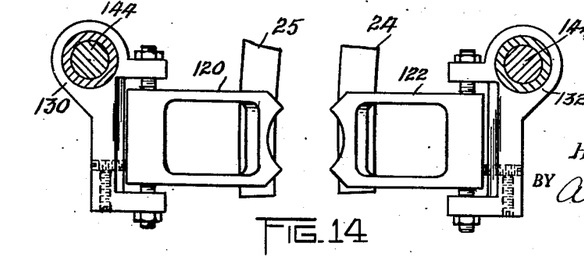
Fig. 14 is a plan view of the cup centering fingers of Fig. 13, the view being taken along line 14—14 of Fig. 13.
Figure 15:
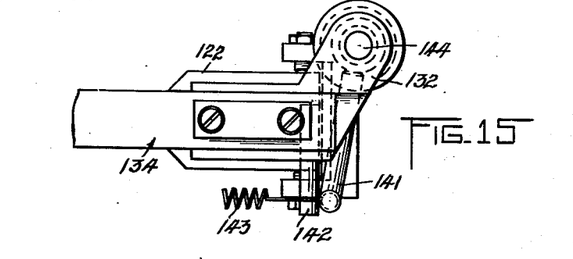
Fig. 15 is a fragmentary view of a portion of the cup centering arrangement of Figs. 14, 15, and 16.

As the spindle leaves the area covered by tracks 24 and 25, the cup 60 thus drops completely down against the face 13 of the mold. The fingers 120 and 122 are pivoted at their rear ends to supports 130 and 132 carried by carriage 134. The details of the pivoting of fingers 120 and 122 upon the support 130 and 132 are shown in Fig. 14 and should be self-explanatory. Carriage 134 is supported from the central axis 11 of the main turret 10 by an arm 135 having at its outer end a parallel arm motion including two flat springs 137 and 138 mounted on blocks 139 and 140 to form a parallelogram which may be resiliently deformed. The deformation of this parallelogram moves the fingers 120 and 122 down into engagement with the cup 60 and up out of engagement with the cup under control of cam 145 carried on shaft 146 which is so rotated that fingers 120 and 122 are engaged with each cup as it reaches station E. In order to prevent jamming in the event fingers 120 and 122 are not lifted out of the way when turret 10 is indexed, supports 130 and 132 are pivotally carried on shafts 144 on carriage 134. Arms 141 bear against fixed pins 142 by the action of spring 143 (Fig. 15). Thus, fingers 120 and 122 are held in position, but may yield to allow an object caught between the fingers to pass along tracks 24 and 25.

In Fig. 16 is shown the coupling arrangement between shaft 146 and shaft 49, each of which makes one revolution at the conclusion of each indexing operation of turrets 10 and 20. Shaft 146 beneath turret 10 carries a sprocket wheel 246 which is coupled to sprocket 247 on shaft 147 by chain 250. Shaft 146 is driven by the mechanism which indexes the main turret 10. Such mechanism is not shown because it may take any conventional form or it may follow that disclosed in the prior application above referred to. The essential factor to bear in mind is that because of the sprocket chain connection 250 the two turrets may be operated in synchronism. Shaft 49, it will be noted, carries cams 150, 151 and 152 which operate switches 160, 161, and 162 respectively.

Figure 17:
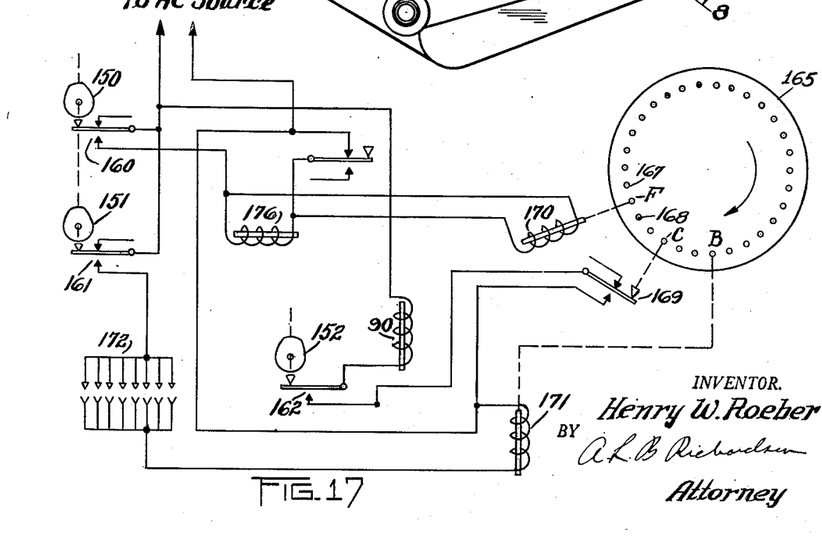

Fig. 17 illustrates only so much of the supervisory control box associated with the molding press as is associated with the pre-heater equipment of the present invention. It includes a memory dial 165 rotated synchronously with turrets 10 and 20. Dial 165 has a number of holes 167 around its periphery, one for each of the spindles 12. These holes carry slidable pins 168 which are arranged to be moved from a normally inoperative position, to a position where they will operate sensing switches such as switch 169, as each pin reaches the switch, by the operation of solenoids 170 and 171, for example.

Assume, for example, that one of the spindles 12 has not a sufficient number of pins as it reaches station B, where the pin checker illustrated by switch 172 is located. The switch 172 is so arranged that the absence of any pin will cause a circuit to be closed, energizing solenoid 171 from the source of AC power. Cam switch 161 is normally open, being closed by rotation of cam 151 only when a spindle 12 is at rest at station B and the pin checker switch 172 is lowered. Energization of solenoid 171 causes a movement of pin 168, so that when the turret reaches position C, switch 169 in series with switch 162 will not be operated to close a circuit to solenoid 90. Switch 162 is closed by cam 152 when the jaws 80 are over a cup on a spindle 22. Arm 78 lifts the cup off the spindle and carries it to a mold on the main turret only if switch 169 remains closed. Thus, if a pin 168 at this position has been moved so as not to actuate switch 169, the cup will be released to remain on the preheater spindle 22.

Switch 166 serves to accurately time the operation of solenoids 170 and 176 with respect to the rotation of shaft 49, and consequently the main turret 10.

While I have particularly shown and described an embodiment of the present invention, it is to be clearly understood that my invention is not limited thereto but that modifications within the scope of the invention may be made.

What is claimed is:

1. An article handling device including a rotatable turret carrying near its periphery a number of article holding spindles, said turret being adapted to be intermittently rotated a distance equal to the angular spacing between adjacent spindles, whereby each spindle is successively moved through a number of operating stations, an article delivery chute at one station above said turret, said chute being inclined in a plane tangent to a circle defined by the centers of said spindles, an article releasing escapement associated with the lower end of said delivery chute, said escapement being adapted upon operation to release one of the articles within said delivery chute, and deposit it upon one of said spindles, and at another station around the periphery of said turret, an article transferring arm pivoted to rotate about an axis parallel to the axis of said turret, said arm having a number of fingers at its free end adapted, upon actuation, in one position of said arm, over a spindle, to pick up an article from said spindle, means for swinging said arm to a second position away from said turret and means for releasing said article picked up by said fingers in the second position.

2. A glass working and molding machine having a first turret carrying a number of molding spindles in a circle around near its periphery, said turret being adapted to be intermittently rotated to carry said spindles successively to a number of operating positions, a second rotatable turret having a number of rotatable spindles and mounted adjacent first turret, and adapted to be intermittently rotated in synchronism with the motion of the first turret, a glass blank delivery chute associated with said second turret, escapement means for depositing a glass blank on each of said spindles of said second turret, means for heating glass blanks on said spindles of said second turret, means associated with a station of said second turret for picking up heated glass blanks from said second turret and transferring them to the spindles of said first turret in succession.

3. An article working machine having a first turret carrying a number of operating spindles in a circle around near its periphery, said turret being adapted to be intermittently rotated to carry said spindles successively to a number of operating positions, a second rotatable turret having a number of rotatable spindles and mounted adjacent said first turret, and adapted to be intermittently rotated in synchronism with the motion of the first turret, an article delivery chute associated with said second turret, escapement means for depositing an article on each of said spindles of said second turret, means for acting upon said articles on said spindles of said second turret, means associated with a station of said second turret for picking up said articles from said second turret and transferring them to the spindles of said first turret in succession.

4. A glass working and molding machine having a first turret carrying a number of molding spindles in a circle near its periphery, said turret being adapted to be intermittently rotated to carry said spindles successively to a number of operating positions, a second rotatable turret having a number of rotatable spindles and mounted adjacent said first turret, and adapted to be intermittently rotated in synchronism with the motion of the first turret, a glass blank delivery chute associated with said second turret, escapement means for depositing a glass blank on each of said spindles of said second turret, means for heating glass blanks on said spindles of said second turret, and means associated with a station of said second turret for picking up heated glass blanks from said second turret and transferring them to the spindles of said first turret in succession, a pair of arcuate tracks associated with said first turret between which the spindles of said first turret are adapted to pass, and means cooperating with said tracks at one station of said first turret for centering said glass blanks with relationship to the spindles on said first turret.

5. A cup handling device including a rotatable turret having a number of rotatable spindles about its periphery, a cup delivery chute above said spindles and tangent to a circle defined by said spindles, and an escapement mechanism for releasing one cup from said chute as each spindle passes beneath the end of said chute, said escapement including a vertically reciprocable carriage at the end of said chute, said carirage including a pair of pivoted fingers having inwardly turned ends adapted to receive one of the cups from said chute, means for lowering said carriage and means responsive to the lowering of said carriage for spreading said fingers, whereby said cup is released, and a pivoted member between said fingers and having a stop piece between said chute and said fingers acting in one position to prevent the release of a cup to said fingers.

6. A cup handling device including a rotatable turret having a number of rotable spindles about its periphery, a cup delivery chute above said spindles and tangent to a circle defined by said spindles, and an escapement mechanism for releasing one cup from said chute as each spindle passes beneath the end of said chute, said escapement including a vertically reciprocable carriage at the end of said chute, said carriage including a pair of pivoted fingers having inwardly turned ends adapted to receive one of the cups from said chute, means for lowering said carriage and means responsive to the lowering of said carriage for spreading said fingers, whereby said cup is released, and a pivoted stop playing between said fingers and operating to prevent the release of a cup to said fingers when in a lowered position, a pair of arcuate tracks concentric with the circle defined by said spindles and adapted to receive one of said cups upon its release from said fingers.

7. A glass working and molding machine having a first turret carrying a number of molding spindles in a circle around near its periphery, said turret being adapted to be intermittently rotated to carry said spindles successively to a number of operating positions, a second rotatable turret adjacent first turret and carrying a number of article holding spindles near its periphery, and adapted to be intermittently rotated in synchronism with the motion of the first turret, a glass blank delivery chute associated with said second turret, means for depositing a glass blank from said chute only on unoccupied ones of said spindles of said second turret, means around the periphery of said second turret for heating glass blanks on said spindles of said second turret, and means associated with a station of said second turret for picking up heated glass blanks from said second turret and transferring them to the spindles of said first turret in regular succession.

8. A glas working and molding machine having a first turret carrying a number of molding spindles in a circle near its periphery, said turret being adapted to be intermittently rotated to carry said spindles successively to a number of operating positions, a second rotatable turret adjacent first turret and carrying a number of article holding spindles near its periphery, and adapted to be intermittently rotated in synchronism with the motion of the first turret, a glass blank delivery chute associated with said second turret, means for depositing a glass blank from said chute on each of said spindles of said second turret, means for heating glass blanks on said spindles of said second turret, and means associated with a station of said second turret for picking up heated glass blanks from said second turret and transferring them to the spindles of said first turret in succession, and means engaging with said blanks at one station of said first turret for centering said glass blanks with relationship to the spindles on said first turret.

9. A cup heating device including a rotatable turret having a number of rotatable spindles about its periphery, a cup delivery chute above said spindles and tangent to a circle defined by said spindles, and an escapement mechanism for releasing one cup from said chute as each spindle passes beneath the end of said chute, said escapement including a vertically reciprocable carriage at the end of said chute, said carriage including a pair of pivoted fingers having inwardly turned ends adapted to receive one of the cups from said chute, means for lowering said carriage and means responsive to the lowering of said carriage for spreading said fingers, whereby said cup is released, and a pivoted stop associated with said fingers and adapted to prevent the release of a cup to said fingers when in a lowered position, and means associated with a number of stations around said turret for heating said cups.

10. An article working machine having a main turret carrying a number of operating spindles in a circle around near its periphery, said turret being adapted to be indexed about carrying said spindles successively to a number of operating stations, a second rotatable turret having a number of rotatable spindles and mounted adjacent said main turret, and adapted to be indexed about in synchronism with the motion of said main turret, an article delivery chute associated with said second turret, escapement means for depositing an article on each of said spindles of said second turret, means for acting upon said articles on said spindles of said second turret, means associated with a station of said second turret for picking up said articles from said second turret and transferring them to the spindles of said main turret in succession, and means for accurately centering said articles on said operating spindles.

11. An article working machine having a main turret carrying a number of operating spindles in a circle around near its periphery, said turret being adapted to be indexed about carrying said spindles successively to a number of operating stations, a second rotatable turret having a number of rotatable spindles and mounted adjacent said main turret, and adapted to be indexed about in synchronism with the motion of said main turret, an article delivery chute associated with said second turret, escapement means for depositing an article on each of said spindles of said second turret, means for acting upon said articles on said spindles of said second turret, means associated with a station of said second turret for picking up said articles from said second turret and transferring them to the spindles of said main turret in succession, a pair of arcuate tracks associated with said main turret between which the spindles of said main turret are adapted to pass, and means arranged over said tracks at one station of said main turret for centering said glass blank with relationship to the spindle at that station, said last mentioned means causing relative rotation between said spindle and said glass blank.

12. A glass working and molding machine having a main turret carrying a number of rotatable molding spindles in a circle near its periphery said turret being adapted to be indexed about carrying said spindles successively to a number of operating stations, each of said molding spindles carrying a mold piece having a circular ring of pin receiving holes therein, pins being inserted into said holes at one of said operating stations, a second rotatable turret adjacent said main turret and adapted to be indexed about in synchronism with the motion of the main turret, means for supplying glass blanks individually to spindles of said second turret, said glass blanks each having a ring of pin receiving apertures therein, means for picking up glass blanks from said second turret and transferring them to the spindles of said main turret in succession, a pair of arcuate tracks associated with said main turret between which the spindles of said main turret are adapted to pass and means arranged over said tracks at one station of said main turret for centering said glass blanks with relationship to the spindle at that station, said last mentioned means causing relative rotation between said spindle and said glass blank whereby said pins are caused to engage with the holes in said glass blank.

13. A glass working and molding machine having a main turret carrying a number of rotatable molding spindles in a circle near its periphery said turret being adapted to be indexed about carrying said spindles successively to a number of operating stations, each of said molding spindles carrying a mold piece having a circular ring of pin receiving holes therein, pins being inserted into said holes at one of said operating stations, a second rotatable turret adjacent said main turret and adapted to be indexed about in synchronism with the motion of the main turret, means for supplying glass blanks individually to spindles of said second turret, said glass blanks each having a ring of pin receiving apertures therein, means for picking up glass blanks from said second turret and transferring them to the spindles of said main turret in succession, a pair of arcuate tracks associated with said main turret between which the spindles of said main turret are adapted to pass and means arranged over said tracks at one station of said main turret for centering said glass blanks with relationship to the spindle at that station, said last mentioned means causing relative rotation between said spindle and said glass blank whereby said pins are caused to engage with the holes in said glass blank, said last mentioned means including a pair of resiliently mounted fingers having concave ends arranged diametrically opposite each other at said station and means for lowering said fingers into contact with said glass blank as each spindle reaches said location.

14. A glass working and molding machine having a main turret carrying a number of rotatable molding spindles in a circle near its periphery said turret being adapted to be indexed about carrying said spindles successively to a number of operating stations, each of said molding spindles carrying a mold piece having a circular ring of pin receiving holes therein, pins being inserted into said holes at one of said operating stations, a second rotatable turret adjacent said main turret and adapted to be indexed about in synchronism with the motion of the main turret, means for supplying glass blanks individually to spindles of said second turret, said glass blanks each having a ring of pin receiving apertures therein, means for picking up glass blanks from said second turret and transferring them to the spindles of said main turret in succesison, a pair of arcuate tracks associated with said main turret between which the spindles of said main turret are adapted to pass and means arranged over said tracks at one station of said main turret for centering said glass blanks with relationship to the spindle at that station, said last mentioned means causing relative rotation between said spindle and said glass blank whereby said pins are caused to engage with the holes in said glass blank, said last mentioned means including a pair of resiliently mounted fingers having concave ends arranged diametrically opposite each other at said one station and means for lowering said fingers into contact with said glass blank as each spindle reaches said one station, said cup transferring arrangement including an arm oscillatable about a vertical axis and reciprocable along the line of said axis, means for oscillating said arm in an arc between one position of rest over a station of said main turret to a second position of rest over a station of said second turret, means for vertically reciprocating said arm at the second position of rest wherein said arm has its end over one of the spindles of said second turret, said arm carrying at said end a number of depending cup receiving fingers, said fingers being adapted to be pivoted radially about a common center and means for spreading said fingers when said arm is in its lowered position, said means including inwardly directed lugs near the pivoted ends of said fingers and electromagnetically operated means adapted to press against said lugs for moving said fingers outwardly.

15. A glass working machine having a turret carrying a number of rotatable molding spindles in a circle near its periphery, said turret being adapted to be intermittently rotated to carry said spindles successively to a number of operating positions, means at one of said operating stations for applying a cup-shaped blank to each of said spindles in succession, a pair of arcuate tracks associated with said turret between which the spindles of said turret are adapted to pass, and means cooperating with said tracks at one station of said turret for centering said glass blanks with relationship to the spindles.

16. A glass working machine having a turret carrying a number of rotatable molding spindles in a circle near its periphery, said turret being adapted to be intermittently rotated to carry said spindles successively to a number of operating stations, each of said molding spindles carrying a mold piece having a circular ring of pin receiving holes therein, pins being inserted into said holes at one of said operating stations, means for supplying glass blanks individually to spindles of said turret, said glass blanks each having a ring of pin-receiving apertures therein, a pair of arcuate tracks associated with said turret between which the spindles of said turret are adapted to pass, and means arranged over said tracks at one station of said turret for centering said glass blanks with relationship to the spindle at that station, said last-mentioned means causing relative rotation between said spindle and said glass blank whereby the pins are caused to engage with the holes in said glass blank.

17. A glass working machine having a turret carrying a number of rotatable molding spindles in a circle near its periphery, said turret being adapted to be intermittently rotated to carry said spindles successively to a number of operating stations, each of said molding spindles carrying a mold piece having a circular ring of pin receiving holes therein, pins being inserted into said holes at one of said operating stations, means for supplying glass blanks individually to spindles of said turret, said glass blanks each having a ring of pin-receiving apertures therein, a pair of arcuate tracks associated with said turret between which the spindles of said turret are adapted to pass, and means arranged over said tracks at one station of said turret for centering said glass blanks with relationship to the spindle at that station, said last-mentioned means causing relative rotation between said spindle and said glass blank whereby the pins are caused to engage with the holes in said glass blank, said last-mentioned means including a pair of resiliently mounted fingers having concave ends arranged diametrically opposite to each other at said station and means for lowering said fingers into contact with said glass blank as each spindle reaches said location.

References Cited in the file of this patent

UNITED STATES PATENTS

| Number | Name | Date |
|---|---|---|
| 1,593,825 | Higgins | July 27, 1926 |
| 1,718,607 | Soubier | June 27, 1929 |
| 1,783,806 | Loebe et al. | Dec. 2, 1930 |
| 1,888,851 | Donovan et al. | Nov. 22, 1932 |
| 1,930,746 | Freese | Oct. 17, 1933 |
| 2,072,502 | Haub | Mar. 2, 1937 |
| 2,175,255 | Chapman | Oct. 10, 1939 |
| 2,301,892 | Lewis | Nov. 10, 1942 |
| 2,312,003 | Schneider et al. | Feb. 23, 1943 |
| 2,359,433 | McNamara | Oct. 3, 1944 |
| 2,427,712 | Casler et al. | Sept. 23, 1947 |
| 2,549,296 | Dilts | Apr. 17, 1951 |